United States Patent [19]
Templin et al.

[11] Patent Number: 5,286,090
[45] Date of Patent: Feb. 15, 1994

[54] WEB ADJUSTER AND LOCK ASSEMBLY FOR A CHILD RESTRAINT SEAT

[75] Inventors: Harry W. Templin, Carmel; David J. Lee, Indianapolis, both of Ind.

[73] Assignee: Indiana Mills & Manufacturing, Inc., Westfield, Ind.

[21] Appl. No.: 837,867

[22] Filed: Feb. 18, 1992

Related U.S. Application Data

[63] Continuation-in-part of Ser. No. 635,715, Dec. 28, 1990, Pat. No. 5,160,186, which is a continuation-in-part of Ser. No. 499,946, Mar. 27, 1990, Pat. No. 5,031,962.

[51] Int. Cl.$^5$ ............................................. A47D 15/00
[52] U.S. Cl. .................................. 297/473; 297/480; 297/485; 297/250.1
[58] Field of Search ............... 297/473, 468, 479, 485, 297/483, 487, 488, 250, 250.1, 480; 280/801, 808, 801 R

[56] References Cited

U.S. PATENT DOCUMENTS

| | | | |
|---|---|---|---|
| 2,775,288 | 12/1956 | Anastasia | 297/485 |
| 3,287,062 | 11/1966 | Board et al. | 297/479 |
| 4,025,111 | 5/1977 | Tanaka et al. | 297/487 X |
| 4,826,246 | 5/1989 | Meeker | 297/250 |
| 5,061,012 | 10/1991 | Parker et al. | 297/487 |

Primary Examiner—Kenneth J. Dorner
Assistant Examiner—Milton Nelson, Jr.
Attorney, Agent, or Firm—Woodard, Emhardt, Naughton Moriarty & McNett

[57] ABSTRACT

A web adjuster and lock assembly for a child restraint seat has a buckle lock assembly which is operably coupled to a web adjuster. The child restraint seat includes a harness which includes a buckle tongue on one end which engages with a buckle lock of the buckle lock assembly, and includes adjacent its other end a tightening web which is received through the web adjuster. The buckle lock of the buckle lock assembly is movable between a rest position, a locked position, and a release position. The web adjuster includes a friction surface which engages the tightening web when the web adjuster is in its web engageable position but is movable to a free position wherein the friction surface is disengaged from the tightening web allowing the web to move in both directions with respect to the web adjuster assembly. The buckle lock assembly is coupled to the web adjuster assembly such that when the buckle lock moves from its locked position to its rest position, the web adjuster assembly moves from its web engageable position to its free position.

14 Claims, 10 Drawing Sheets

WEB ADJUSTER AND LOCK ASSEMBLY FOR A CHILD RESTRAINT SEAT

CROSS-REFERENCE TO RELATED APPLICATION

This application is a continuation-in-part of the commonly owned U.S. patent application Ser. No. 635,715 (now U.S. Pat. No. 5,160,186) filed Dec. 28, 1990 and entitled LOW PROFILE WEB ADJUSTER, which application is also a continuation-in-part of the commonly owned U.S. patent application Ser. No. 499,946 (now U.S. Pat. No. 5,031,962) filed Mar. 27, 1990 and entitled LOW PROFILE WEB ADJUSTER.

BACKGROUND OF THE INVENTION

1. Field of the Invention

This invention is in the field of fasteners for securing webs and belts.

2. Description of the Prior Art

Recently enacted laws require seats within automobiles for restraining a child or infant. Typically, the seats include a harness which is releasably securable around the child with the harness passing over the shoulders and having a front end releasably locked to a buckle or similar fastening device. Such a seat with harness is shown in U.S. Pat. No. 4,660,889 issued to Indiana Mills & Manufacturing, Inc. The harness passing over the child's shoulders and through the seat has an opposite end frictionally engaged by a web adjuster mounted to the seat. The web adjuster has a pivotally mounted cam member which may be released to facilitate sizing of the harness relative to the child. Such web adjusters are also shown in U.S. Design Pat. Nos. 296,678 and 303,232 assigned to Indiana Mills & Manufacturing, Inc. Other web adjusters incorporating pivotally mounted cams with gripping surfaces for holding webs are shown in the U.S. Pat. Nos. 3,434,186 issued to Rennert and 3,872,550 issued to Yang.

The aforementioned web adjusters include an outwardly extending handle allowing the user to pivot the cam member for releasing the web relative to the adjuster. In U.S. Pat. No. 4,679,852 assigned to Indiana Mills & Manufacturing, Inc. a rotatable rod mounted to the child's seat extends through the web adjuster handle to allow the user to rotate the rod and thereby pivot the web adjuster handle. I have provided a web adjuster having a more compact means for operating the pivotally mounted cam member of the web adjuster. Disclosed herein is such a web adjuster having alternate designs. In one design, the cam member may be pushed for pivoting the cam member whereas in an alternate design, the control means may be pulled for pivoting and thereby releasing the cam member.

The web adjusters and buckle locks for child restraint seats of the prior art are operated independently of one another. In other words, the buckle and lock must be released by one actuator, while the web adjuster has a separate and independent actuator which allows the web passing through the web adjuster to be adjusted. What is needed is a buckle lock and web adjuster assembly whose actuating systems are coupled so that the process of placing and securing the child to the child restraint seat is accomplished more easily by allowing both ends of the harness to be loose relative to the seat whenever the buckle is unlocked. Thus, egress and ingress of the child relative to the seat and harness is facilitated. Once the child is positioned on the seat and the harness is extended over the child, the harness is buckled simultaneously locking the buckle and the web adjuster, and allowing the web to be pulled tight.

SUMMARY OF THE INVENTION

One embodiment of the present invention includes a harness, lock and adjuster assembly for a child restraint seat comprising a housing and a buckle lock movably mounted to the housing, such that the buckle lock can move with respect to the housing between a rest position, a locked position and a release position. Also included is a harness having a buckle tongue mounted on its first end and a length of tightening web adjacent its second end. A web adjuster is mounted to the housing and has a friction surface biased to a web engageable position for holding the tightening web against movement in one direction along the length of the tightening web. The friction surface of the web adjuster is also movable to the free position thereby allowing the tightening web to move relative to the web adjuster in either direction along the length of the tightening web. The buckle lock is engageable with the buckle tongue of the harness to secure the first end of the harness to the housing when the buckle lock is in its locked position. The buckle lock is capable of being disengaged from the buckle tongue thereby releasing the first end of the harness with respect to the housing when the buckle lock is in its release position. The buckle lock is biased to move toward a rest position when the buckle tongue is removed from the buckle lock. Also included is a first actuator which operably connects the friction surface of the web adjuster to the buckle lock such that when the buckle lock moves to its rest position, the first actuator moves the friction surface of the web adjuster to its free position. A second actuator is provided for moving the buckle lock from its locked position to its released position in order to release the buckle tongue from the buckle lock.

It is an object of the present invention to provide a new and improved web adjuster.

A further object of the present invention is to provide a web adjuster having a low profile.

Yet another object of the present invention is to provide a low profile web adjuster useable with a support.

An additional object of the present application is to provide a web adjuster which will increase the web holding force during abnormal high loading.

Still another object of the present invention is to provide an improved web adjuster and buckle lock assembly for child restraint seats.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
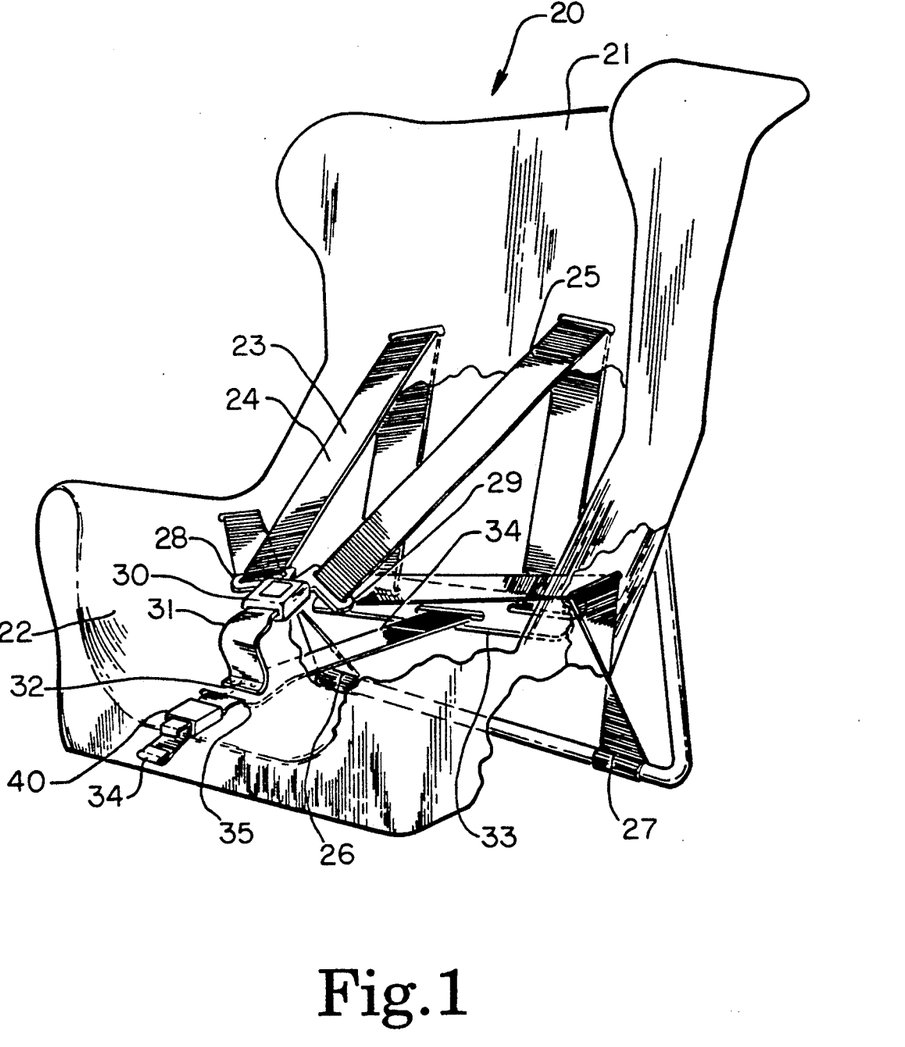
FIG. 1 is a perspective fragmentary view of a seat having a web adjuster according to one aspect of the present invention.
Figure 2:
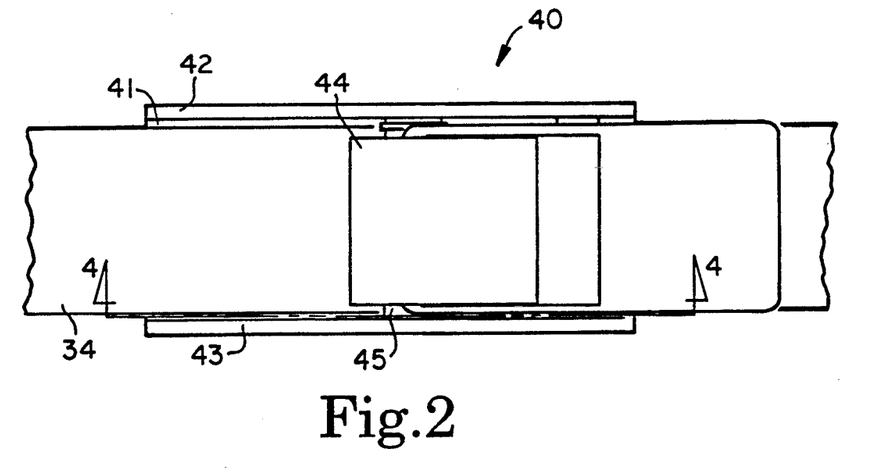
FIG. 2 is an enlarged top view of an alternative web adjuster mounted to the seat of FIG. 1 with the outer housing removed.
Figure 3:
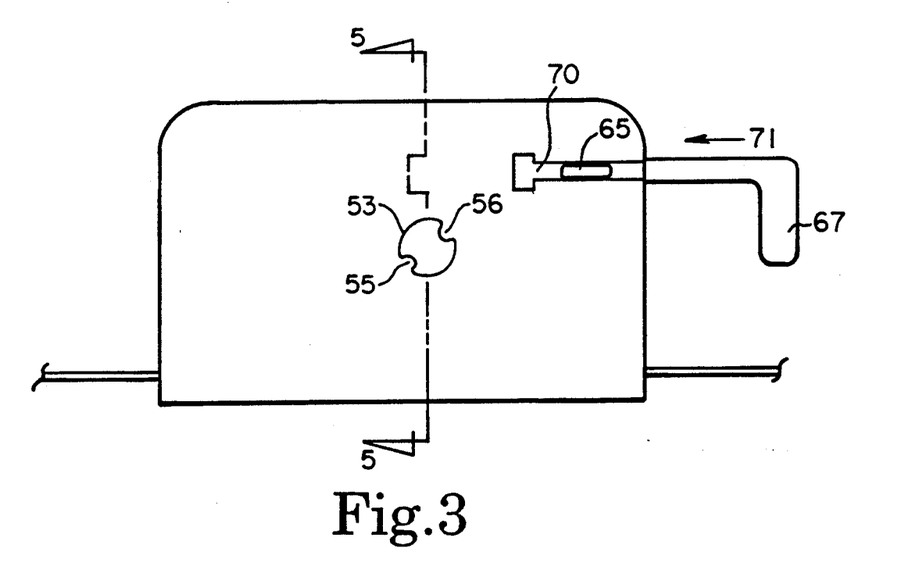
FIG. 3 is a side view of the adjuster of FIG. 2.
Figure 4:
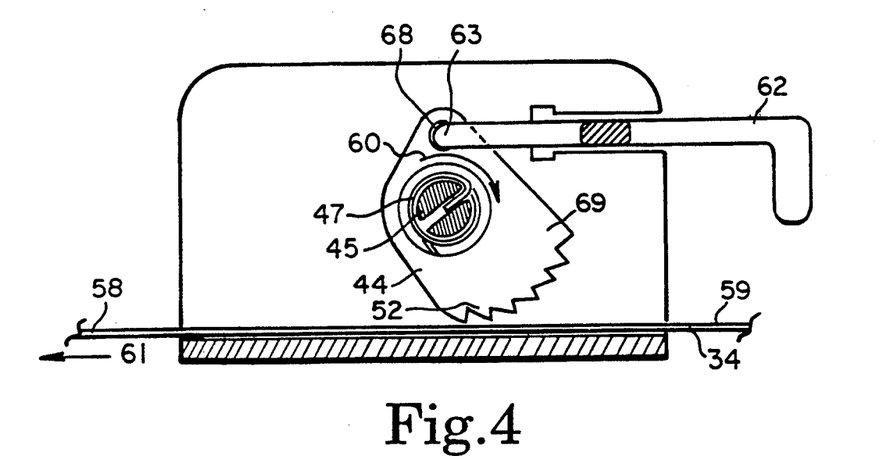
FIG. 4 is a cross-sectional view taken along the line 4—4 of FIG. 2 and viewed in the direction of the arrows.
Figure 5:
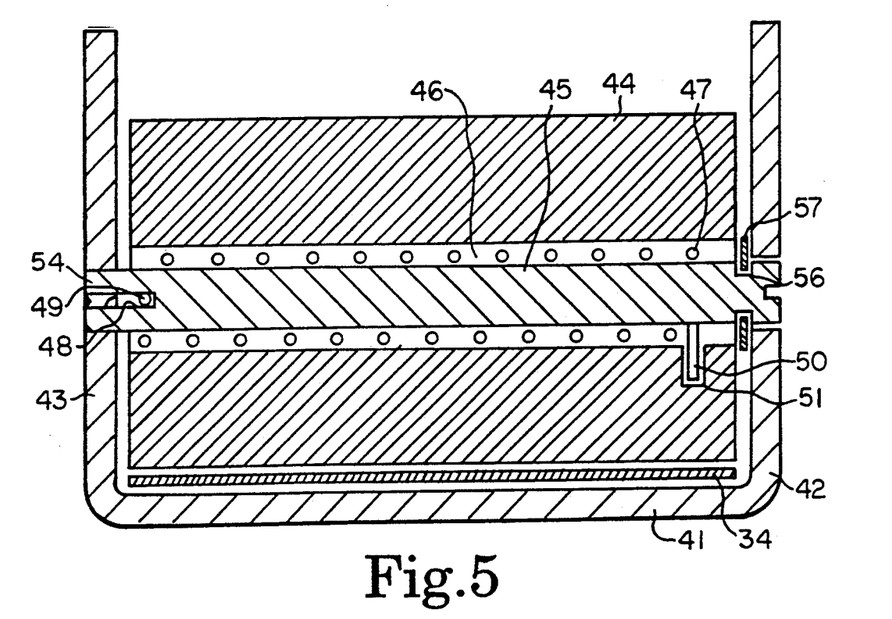
FIG. 5 is an enlarged cross-sectional view taken along the line 5—5 of FIG. 3 and viewed in the direction of the arrows.

Referring now more particularly to FIG. 1, there is shown a child seat 20 having a back portion 21 and seat portion 22 integrally connected together. A harness 23 is mounted to the seat and is designed to adjust to the size of the child placed on the seat. A variety of different types of harnesses may be installed onto the seat. In FIG. 1, a 5 point harness is depicted. As such, harness 23 includes two webs 24 and 25 having respectively first ends 26 and 27 fixedly fastened to the seat with both webs slidably extending respectively through a pair of conventional separate tongues 28 and 29 releasably lockable to a conventional seat belt buckle 30. Buckle 30 is secured to strap 31 having a strap end 32 fixedly secured to the seat. Webs 24 and 25 extend slidably through slots provided in back portion 21 of the seat with the webs then extending rearwardly of the seat being fastened to a bar 33. The bar is also fastened to a third web 34 extending forwardly through a slot 35 formed in seat portion 22. Web 34 then extends releasably through a web adjuster 40 fastened to the seat. Operation of the web adjuster allows web 34 to be loosened or tightened which in turn results in the loosening or tightening of harness 23.

Many variations are contemplated and included in the present invention. For example, the web adjuster is shown in combination with a 5 point harness although the web adjuster will work equally well with other types of harnesses so long as the web adjuster is operable to loosen or tighten the harness.

Figure 6:
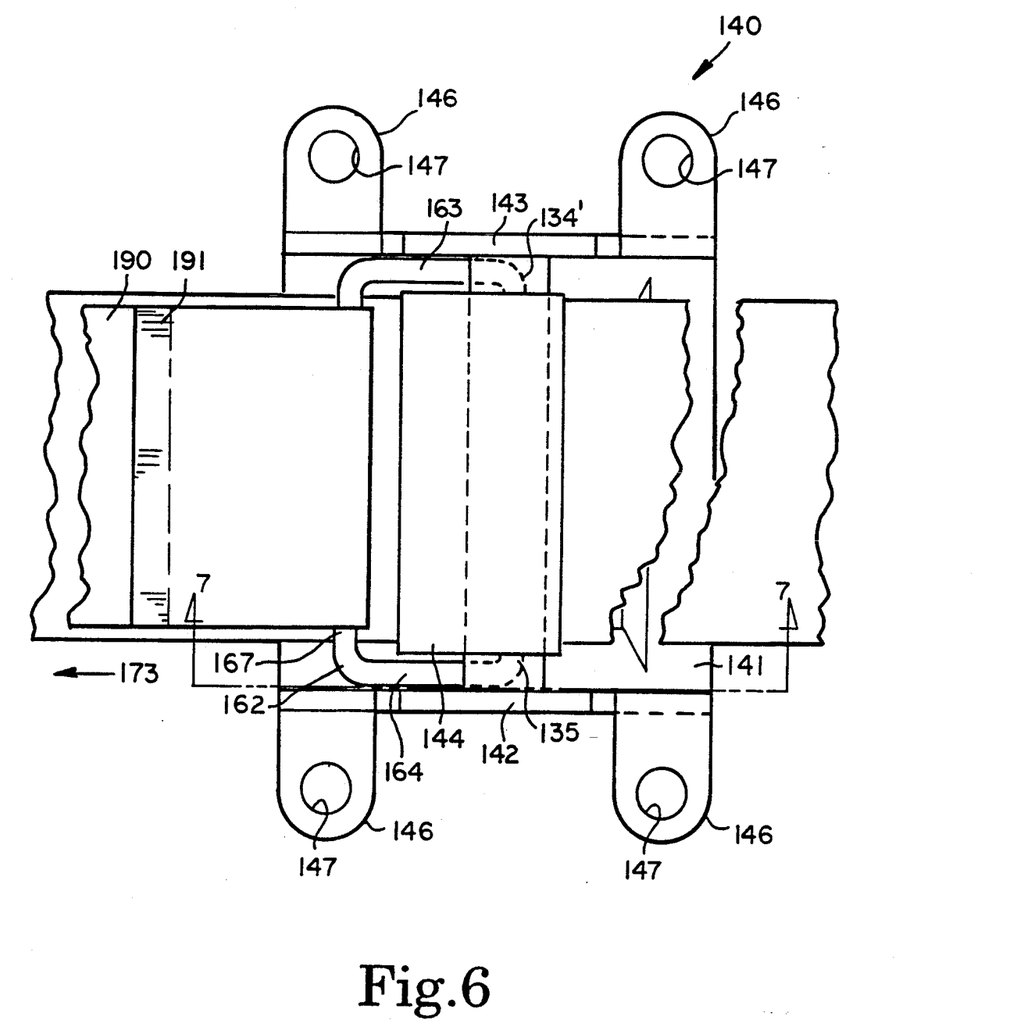
FIG. 6 is a top view of still another alternative web adjuster according to one aspect of the present invention.
Figure 7:
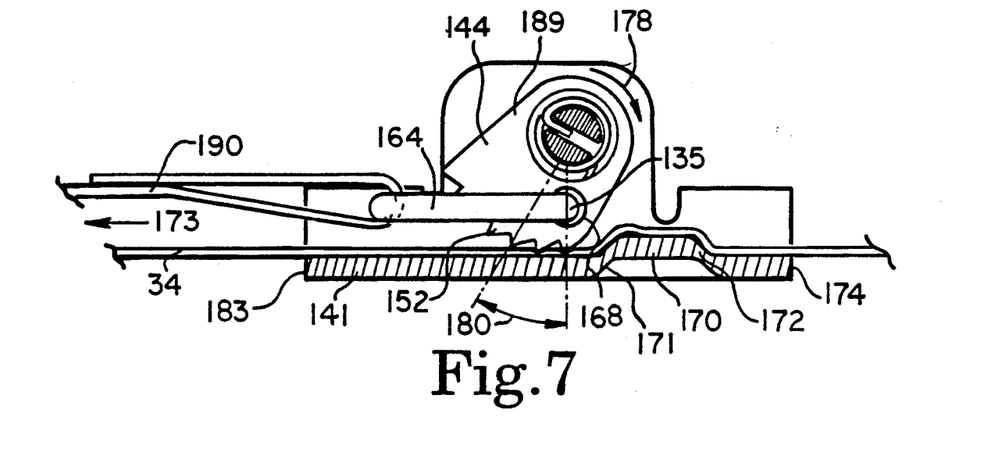
FIG. 7 is a cross sectional view taken along the line 7—7 of FIG. 6 and viewed in the direction of the arrows.
Figure 8:
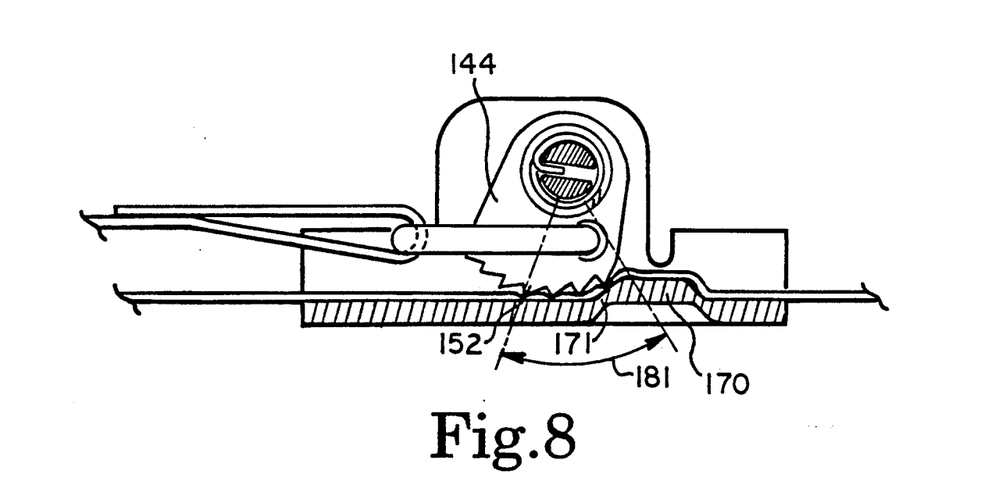
FIG. 8 is the same view as FIG. 7 only showing the adjuster in the locked position under abnormal high loads.

An alternate version of the web adjuster is shown in FIG. 2 through FIG. 5 with another alternate version of the adjuster being shown in FIG. 6 through FIG. 8. Web adjuster 40 includes an outer housing enclosing a U-shaped metal frame having a base wall 41 integrally joined to a pair of upstanding walls 42 and 43. The web adjuster housing shown in FIG. 1 has been removed from the remaining figures to depict the inner construction. Base wall 41 is fixedly fastened by rivets or other suitable fastening means to the seat portion 22 of the seat so that the base wall extends generally horizontal. Pivotally mounted by pin 45 to and between walls 42 and 43 is a cam member 44. Cam member 44 (FIG. 5) includes a through hole 46 within which is positioned a helical spring 47 and pin 45. The pin extends centrally through the helical spring and has a slot 48 at one end to receive one end 49 of the spring with the opposite end 50 of the spring extending into a hole 51 provided in the cam member. The helical spring is installed with the opposite ends in slot 48 and hole 51 so that the plurality of friction ridges 52 (FIG. 4) provided on the outer surface of the cam member are forced against web 34 trapping the web between the cam member and base wall 41.

Wall 43 includes an aperture 53 (FIG. 3) through which end 54 of the pin extends. Aperture 53 is restricted forming a pair of inwardly projecting teats 55 and 56 which extend into slot 48 preventing rotational movement of the pin. The opposite end of the pin includes a groove 56 (FIG. 5) located immediately inward of wall 42 when the pin is installed to the adjuster. A conventional C-shaped clamp 57 is mounted within the groove preventing the pin from disengaging walls 42 and 43.

End portion 58 (FIG. 4) of web 34 extends through a slot 35 (FIG. 1) formed in seat support 22 and is attached by means of bar 33 to the harness. The free end 59 of the web extends through a hole in the web adjuster housing and lies against the forward portion of the seat. The spring is operable to normally force cam member 44 in the clockwise direction indicated by arrow 60 (FIG. 4) thereby causing the friction engaging surface of the cam formed by teeth 52 to engage web 34 preventing movement of the web in the web release direction of arrow 61. At the same time, the web may be grasped by end 59 and pulled in a direction opposite of arrow 61 to tighten the harness. In order to release the harness, a push control 62 is slidably mounted to and between the upstanding walls of the frame and when pushed will rotate cam member 44 in a counter clockwise direction as viewed in FIG. 4 thereby moving teeth 52 apart from web 34 and allowing movement of the web in the direction of arrow 61 thereby loosening the harness.

Push control 62 (FIG. 4) includes a pair of inwardly turned and opposed distal ends extending into holes provided on the opposite ends of the cam member above the pivot axis. For example, end 63 extends into hole 68 (FIG. 4) provided on end 69 of the cam member. A pair of projections provided on the opposite edges of push control 62 extend slidably respectively into slots provided on upstanding walls 43 and 42. For example, projection 65 (FIG. 3) is slidably mounted within slot 70 in upstanding wall 43. The push control includes a depending wall 67 allowing the user to push the control in the direction of arrow 71 (FIG. 3) thereby pivoting the cam member in a counter clockwise direction as viewed in FIG. 4 releasing the cam member from the web.

Another version of the web adjuster is shown in FIG. 6 through FIG. 8. Web adjuster 140 includes a frame having a pair of upstanding walls 142 and 143 integrally joined to a base wall 141 which extends generally horizontal and is affixed to the horizontal seat portion of the child seat. A cam member 144 is pivotally mounted to walls 142 and 143. In lieu of utilizing push control 62, web adjuster 140 has a pull control 162 (FIG. 6). Pull control 162 has a pair of arms 163 and 164 having inwardly turned distal ends 134 and 135 projecting into holes provided on the opposite outwardly facing ends of cam 144. For example, arm 164 has an inwardly turned distal end 135 projecting into hole 168 (FIG. 7) provided on end 189 of the cam element. A rod 167 is integrally joined to and between arms 164 and 163 with a fabric tab 190 extending around rod 167. One end 191 of tab 190 is secured by stitching or other suitable means to the main body of the tab with the opposite end of the tab extending freely away from the web adjuster. Thus, tab 190 may be pulled in the direction of arrow 173 thereby causing clockwise rotation 178 of cam 144 as viewed in FIG. 7 forcing the friction teeth 152 to disengage web 34 allowing the web to be moved in the direction opposite of arrow 173 thereby loosening the harness. Release of tab 190 allows the helical spring to rotate the cam in a counter clockwise direction as viewed in FIG. 7 thereby engaging web 34 and preventing further loosening of the harness. Web 34 may be moved in the direction of arrow 173 to tighten the harness even though teeth 152 are engaged with the web. Notably, fabric strap 190 may be moved in the direction of arrow 173 which is the same direction that web 34 is moved when tightening the harness.

FIG. 7 illustrates the adjuster in the locked position under normal loads. The bottom wall 141 of the bracket includes an upraised rib 170 located between the pivot axis of cam member 144 and the aft end 174 of the bracket. Rib 170 is integral with bottom wall 141 and is joined thereto by means of an upwardly sloping front wall 171 and an upwardly sloping back wall 172. The rib extends across the width of wall 141 between upraised walls 142 and 143 and has opposite ends terminating inwardly of the upstanding walls 142 and 143. Thus, the base wall 141 is flat between the upstanding walls and the opposite ends of the rib. In one embodiment, the rib terminated approximately ¼ inch inwardly of upstanding walls 142 and 143. Under normal loading, teeth 152 engage belt 134 and force the belt against the upwardly facing surface of bottom wall 141 at a location between the front end 183 of the bracket and the upwardly sloping wall 171 of rib 170. The upwardly facing flat surface of wall 141 is located further from the pivot axis of cam 144 than the upwardly facing surface of wall 171. The distance from the teeth 152 to the pivot axis of the cam is such that the cam member under normal loading positions teeth 152 atop the upwardly facing surface of wall 141 apart from the upwardly facing surface of wall 171. That is, under normal locked conditions, the teeth of the cam are not located adjacent wall 171 and thus the belt is not lockingly forced thereagainst. On the other hand, under abnormal high loading such as experienced in a crash or under emergency conditions, the passenger is forced against belt 34 thereby pulling the belt in the direction opposite of arrow 173 forcing the cam to pivot further in a counterclockwise direction as viewed in FIG. 7 thereby forcing the teeth atop the upwardly facing surface of wall 171 holding the belt between wall 171 and the cam member. To unlock the adjuster, tab 190 is then pulled in the direction of arrow 173.

FIG. 8 illustrates the adjuster in the locked position under abnormal high loads. Such loads occur in a crash or other emergency situation whereby cam member 144 pivots an additional amount in the counterclockwise direction as viewed from FIG. 7-FIG. 8 thereby positioning teeth 152 against the upwardly facing surface of wall 171 of rib 170. Belt 34 is thereby forced against and locked to rib 170. Teeth 152 while forcing the belt against wall 171 also force the belt against the upwardly facing flat surface of wall 141 immediately in front of wall 171 thereby not only increasing the area of contact between the belt, teeth and wall but also most importantly increasing the angle of contact around the pivot axis of cam 144 existing between the belt, teeth, wall 141 and rib 172. For example, the angle 180 (FIG. 7) of contact around the cam pivot axis between the belt, teeth and wall 141 increases to angle 181 (FIG. 8) under high loading with teeth 152 forcing the belt against wall 141 and wall 171. In addition to providing additional locking of the belt, the rib is operable to prevent the bottom wall from bowing under extreme loads. Without such a rib, the bottom wall bows under high loading thereby forcing the wall apart from the teeth and belt considerably reducing the locking ability of the adjuster. The rib is particularly advantageous in that the area of contact between the belt, rib and bottom wall is across substantially the entire width of the adjuster thereby preventing the belt from cocking or wiggling loose.

FIGS. 9-14 show and describe how the version of the web adjuster shown in FIGS. 6-8 is incorporated into a lock and web adjuster assembly according to the present invention. In other words, the web adjuster 140 shown in FIGS. 6-8 is identical to the web adjuster shown in FIGS. 9-14, except in FIGS. 9-14, the pull control 162 of the web adjuster is attached to an extension hook rather than a portion of webbing as shown in FIGS. 6-8. In the preferred embodiment of the present invention shown in FIGS. 9-12, the action of the web adjuster is coupled to the action of the buckle lock.

Figure 9:
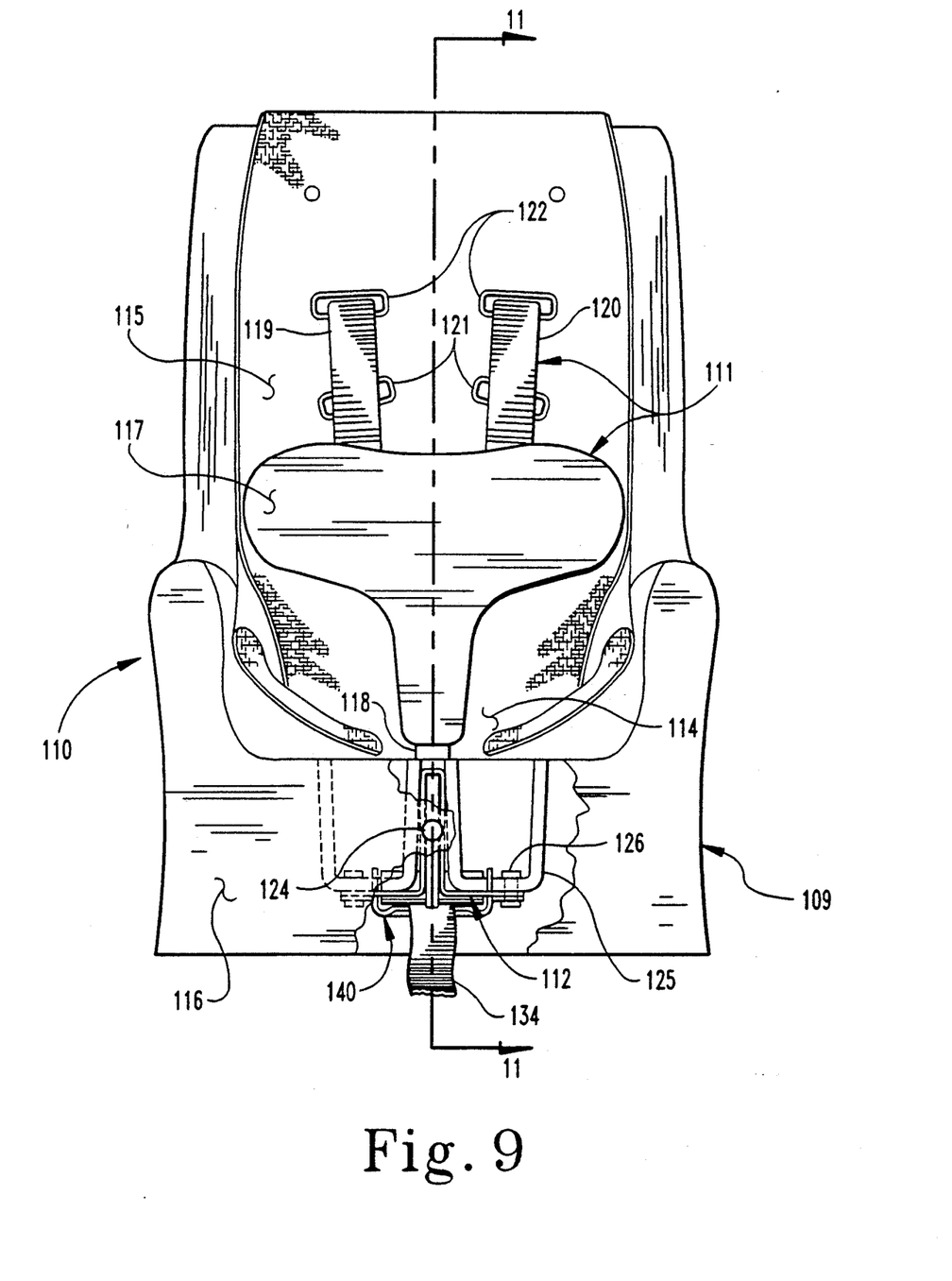
FIG. 9 is a fragmentary front elevational view of a child restraint seat according to the preferred embodiment of the present invention.

Referring now more particularly to FIG. 9, there is shown a child restraint seat 110 having a child support 109, a harness 111, a buckle lock assembly 112 and a web adjuster 140 as previously described. Child support 109 includes a seat portion 114, a backrest 115, and a front portion 116. The child is placed upon seat 114 with his or her legs positioned adjacent front portion 116 of the child support 109. The harness 111 is movably mounted to the child support and is designed to adjust to the size of the child placed on the seat. A variety of different types of harnesses may be installed to the child support 109. In this case, harness 111 includes a restraining pad portion 117 which is positionable against the child, a buckle tongue 118 mounted to and adjacent the restraint pad, and includes a pair of flexible belts or webs 119 and 120 that are also attached to pad restraint 117 and which pass through slits 122 in backrest 115 to the back of the child support 109. In the case of smaller children, the webs 119 and 120 can be re-threaded through slits 121 in backrest 115.

Figure 10:
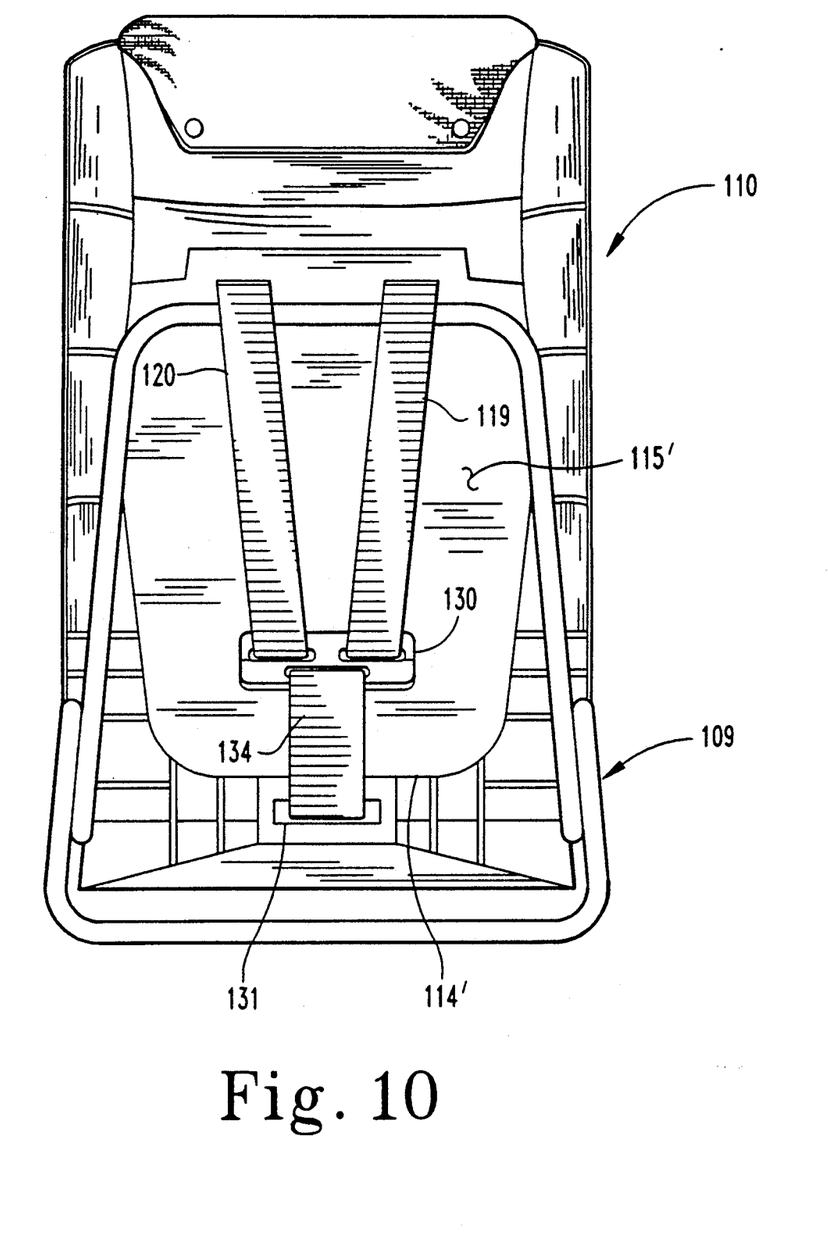
FIG. 10 is a rear elevational view of the child restraint seat shown in FIG. 9.
Figure 11:
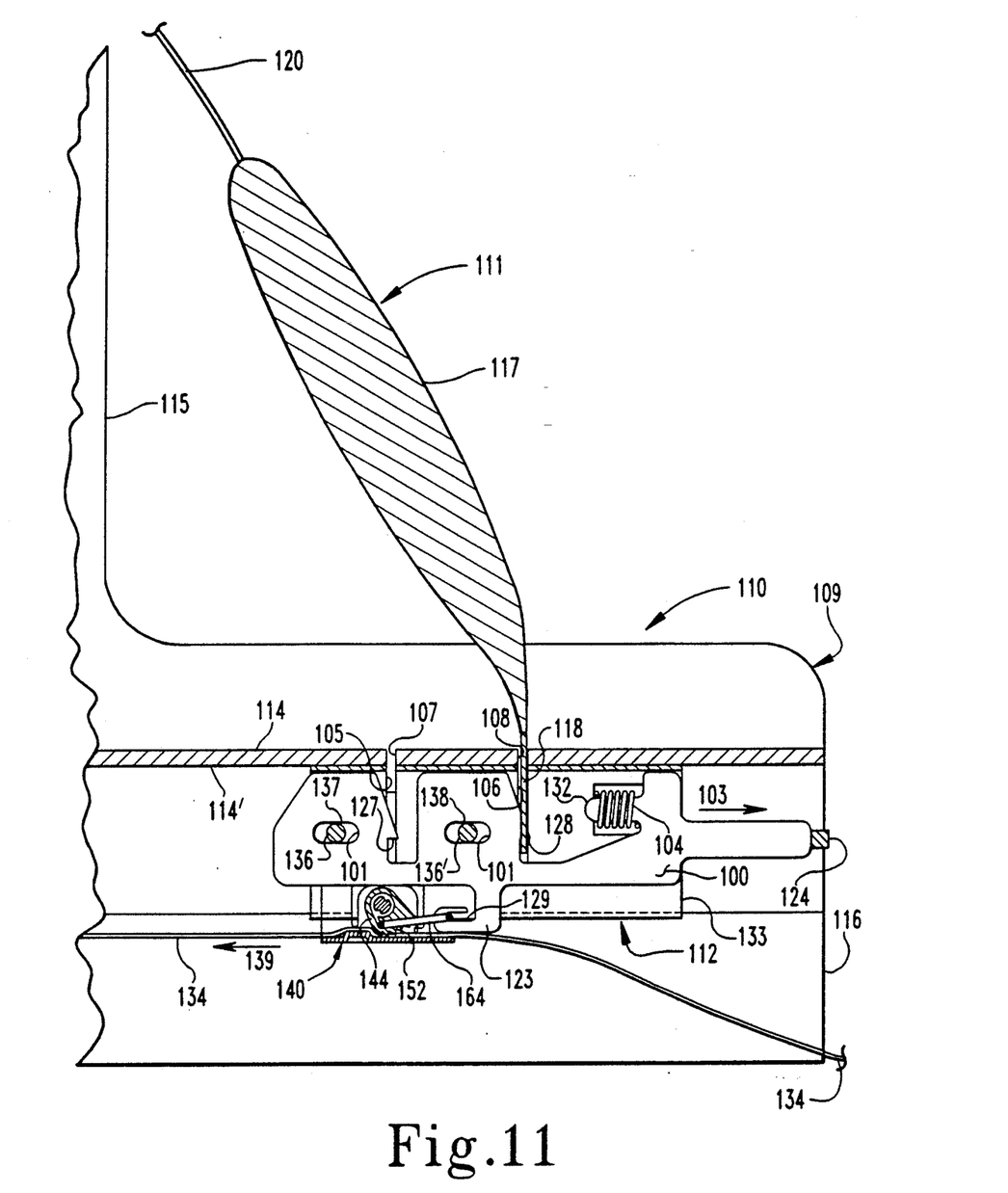
FIG. 11 is a fragmentary side sectional view of the child restraint seat of FIG. 9 taken along the line 11—11 and viewed in the direction of the arrows.
Figure 12:
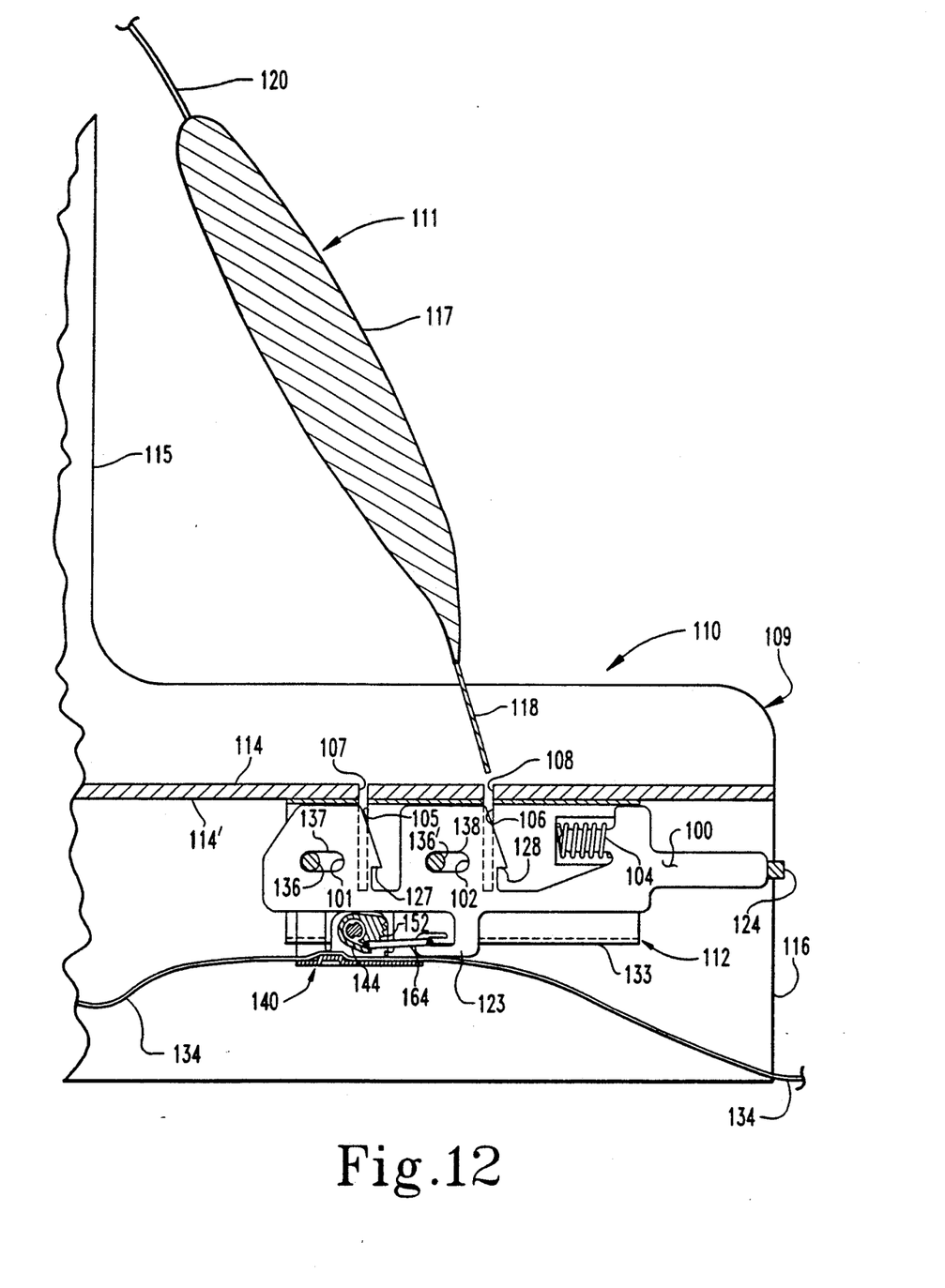
FIG. 12 is a fragmentary sectioned side sectional view analogous to FIG. 11 except showing the harness of the child seat released from the lock and web adjuster.

Webs 119 and 120 are attached to bar 130 adjacent the rear portion 115' of backrest 115 as shown in FIG. 10. A tightening web 134, which is also considered part of harness 111, is attached to bar 130 and runs adjacent the underside 114' of seat 114 through slot 131 toward the front portion 116 of the child support 109. A portion of the tightening web 134 passes through web adjuster 140 as shown in FIGS. 9, 11 and 12, and extends forward of front portion 116 of child support 109. When tightening web 134 is pulled away from front portion 116, webs 119 and 120 and pad restraint 117 are tightened against the child, thereby securing the child to the child restraint seat 110. A slot may be provided in front portion 116 or a portion of tightening web 134 to extend therethrough.

FIGS. 11 and 12 illustrate the coupled action of the buckle lock and web adjuster assembly of the present invention. Buckle lock assembly 112 includes an inverted T-shaped housing 133 (FIG. 13) within which a pawl 100 is movably mounted therein. Pawl 100 includes slots 137 and 138 which enable pawl 100 to be movably mounted on pins 136 and 136' (FIG. 11) attached to housing 133. The ends of slots 137 and 138 define the limit to which pawl 100 can move with respect to housing 133. Buckle lock assembly 112 also includes a compression spring 104 which biases pawl 100 in direction 103 with respect to housing 133. Pawl 100 includes a finger extension 132 which receives compression spring 104. One end of compression spring 104 abuts against one side of a cavity made in housing 133 while the other side of compression spring 104 abuts against the base of finger 132 of pawl 100. Spring 104 is compressed regardless of the position of pawl 100 with respect to housing 133. Pawl 100 includes buckle locks 127 and 128 which are positioned adjacent slots 105 and 106 in housing 133 to enable buckle tongue 118 to be secured with respect to buckle lock assembly 112 as shown in FIG. 11. Tongue 18 is of conventional design and includes an aperture through which the hook-shaped locks 127 and 128 may be extended to lock the tongue thereto. Seat 114 of child support 109 includes two slots 107 and 108 which are arranged adjacent slots 105 and 106, respectively, thus allowing the child restraint 110 to be easily adapted to smaller children. Pawl 100 also includes a hook extension 123 located adjacent web adjuster 140.

Web adjuster 140 includes a cam member 144 pivotably mounted and spring biased in a frame as discussed previously in relation to the version shown in FIGS. 6-8. Cam member 144 includes a plurality of friction teeth 142 to engage tightening web 134 thereby preventing tightening web 134 from moving with respect to web adjuster 140 in direction 139. However, web adjuster 140 still permits tightening web 134 to be moved in the opposite direction of arrow 139 in order to tighten the harness against the child supported in the child restraint seat 110. Buckle lock assembly 112 is coupled to web adjuster 140 by pull control 164, as previously described. Thus, buckle locks 127 and 128 of pawl 100 are operably connected via pull control 164 to the friction teeth 152 of web adjuster 140. In this way, when pawl 100 moves in the direction of arrow 103 with respect to housing 133, pull control 164 causes cam member 144 to rotate disengaging friction teeth 152 with tightening web 134. FIG. 11 shows friction teeth 152 of cam member 144 in its web engageable position, and FIG. 12 shows friction teeth 152 in their free position. Hook extension 129 of pawl 100 is connected to pull control 164 of web adjuster 140 in lieu of the tab 190 discussed in relationship to FIGS. 6-8.

Buckle locks 127 and 128 can be thought of as being capable of assuming three different positions. FIG. 11 shows buckle lock 127 in its locked position engaging buckle tongue 118, which is attached to the harness. FIG. 12 shows buckle locks 127 and 128 in their rest position after buckle tongue 118 has been removed from buckle lock assembly 112 thus allowing compression spring 104 to urge pawl 100 forward with respect to housing 133. When buckle locks 127 and 128 are moved to their rest position as shown in FIG. 12, extension hook 123 of pawl 100 draws pull control 164 which in turn rotates cam member 144 to disengage friction teeth 152 from tightening web 134. Thus, when buckle locks 127 and 128 are in their rest position, neither end of harness 111 is restricted from moving with respect to the child support 109 of child restraint seat 110. When pawl 100 is moved inwardly such that pins 136 and 136' are positioned against ends 101 and 102 of slots 137 and 138, buckle locks 127 and 128 are moved to their release position such that buckle tongue 118 can be removed from either slot 105 or 106 in housing 133. Buckle locks 127 and 128 can be moved toward their release position by pushing on button 124 which is located adjacent front portion 116 of child support 109. Button 124 is attached to one end of pawl 110 as shown in FIGS. 11 and 12.

In the preferred embodiment shown in FIGS. 9-12, web adjuster 140 is mounted to the underside of buckle lock assembly 112 which in turn is mounted adjacent the underside 114' of child support 109. Web adjuster 140 can be attached to buckle lock assembly 112 in any conventional manner such as by riveting. Child support 109 preferably includes plastic moldings 125 (FIG. 9) which are adapted to receive the inverted T-shaped housing 133 therein and provide a structure for attaching buckle lock assembly 112 to moldings 125 via rivets 126 as shown in FIG. 1.

Before the child is placed into child restraint seat 110, both ends of harness 111 are free to move with respect to child support 109 in order to better facilitate placing the child in the seat. Buckle locks 127 and 128 are biased toward their rest position by compression spring 104 which simultaneously acts to rotate cam member 144 to its free position disengaging friction teeth 152 from tightening web 134. When buckle tongue 118 is placed through slot 108 of seat 114 and then into slot 106 of housing 133 to engage hook-shaped buckle lock 128, pawl 100 is moved such that buckle locks 127 and 128 are in their locked position. This movement of pawl 100 permits the spring-biased cam member 144 to rotate back to its web engageable position such that tightening web 134 is prevented from moving in direction 139 (FIG. 11). When it is desired to release the child from the child restraint seat 110, one simply pushes button 124 which moves pawl 110 against the action of compression spring 104 to reposition buckle locks 127 and 128 in their release position. When buckle locks 127 and 128 are moved to their release position, friction teeth 152 of web adjuster 140 remain in their web engageable position against tightening web 134 because pull control 162 moves forward in channel 129 of hook extension 123 (FIG. 11).

Figure 13:
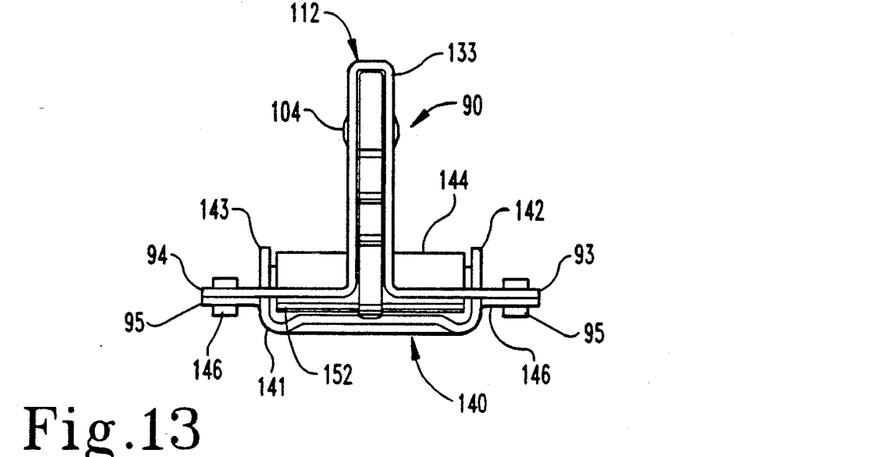
FIG. 13 is a front elevational view of a lock and web adjuster assembly of FIG. 9 removed from the child seat.
Figure 14:
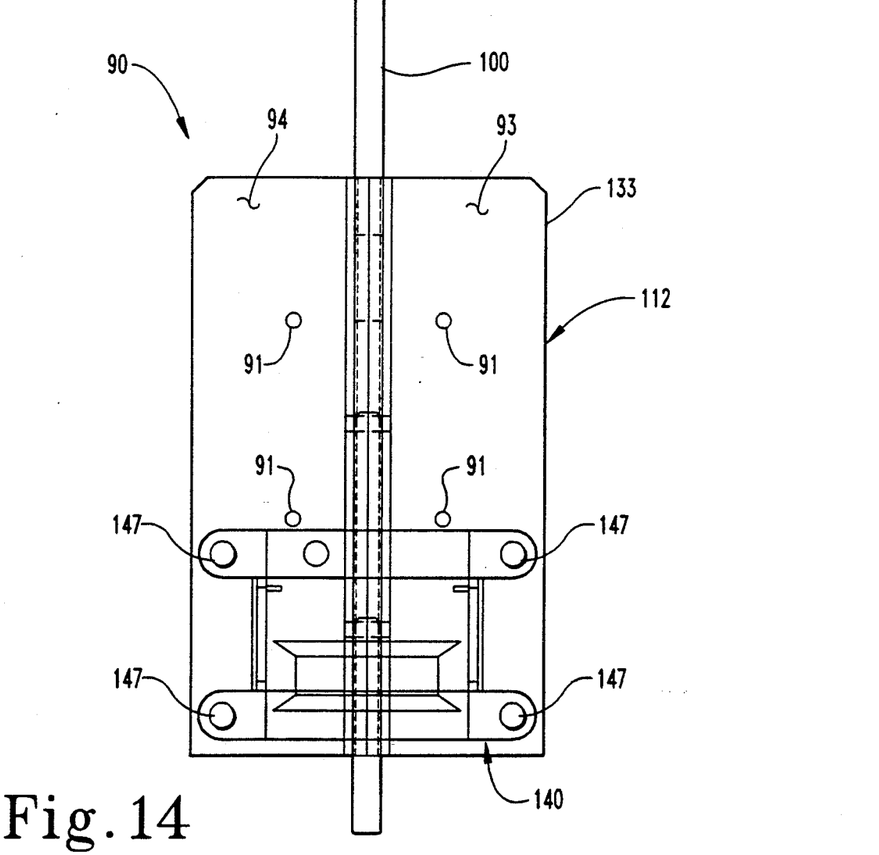
FIG. 14 is a bottom elevational view of the lock and web adjuster assembly shown in FIG. 13.

FIG. 13 shows a lock and adjuster assembly 90 isolated from the child restraint seat. Lock and adjuster assembly 90 includes a buckle lock assembly 112 which is attached to a web adjuster 140 as previously described. Web adjuster 140 includes four tab flanges 146 (FIG. 6), each of which includes a bore 147 to facilitate attachment of web adjuster 140 to the buckle lock assembly 112. Buckle lock assembly 112 includes an inverted T-shaped housing 133 having flanges 93 and 94. Pawl 100 is movably mounted within T-shaped housing 133 as discussed earlier. Flange tabs 146 of web adjuster 140 align with flanges 93 and 94 of housing 133 thus enabling the two to be attached together via rivets 95. FIG. 14 shows a bottom view of the lock and adjuster assembly 90. Flanges 93 and 94 of housing 133 include a plurality of bores 91 which enable the lock and adjuster assembly 90 to be attached to child support 109 by rivets 126 as shown in FIG. 9.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child restraint seat for mounting in a vehicle comprising:
   a child support having a seat with a housing therebeneath, a backrest and a front portion;
   a harness having a first end and a second end, said harness mounted to said child support and including a child restraining portion, said harness including a buckle tongue on said first end and a length of tightening web adjacent said second end;
   at least one buckle lock attached to said child support, said at least one buckle lock mounted to said housing mounted under said seat of said child support, said seat including at least one opening for passing said buckle tongue through said seat to engage said at least one buckle lock, said at least one buckle lock and said housing having interactive support means operable to allow said at least one buckle lock to move to a rest position, a locked position and a release position, said at least one buckle lock being connected to said buckle tongue to secure said first end of said harness to said child support when in said locked position, said at least one buckle lock being separated from said buckle tongue releasing said first end of said harness with respect to said child support when in said release position, said at least one buckle lock positionable in said rest position when said buckle tongue is separated from said at least one buckle lock;
   web adjuster means attached to said child support and having a friction surface biased to a web engageable position operable for holding said tightening web against movement in one direction along said length of said tightening web but movable to a free position allowing said web to move relative to said web adjuster means in either direction along said length of said tightening web, said web adjuster means including a web adjuster;
   first actuator means connecting said web adjuster with said friction surface to said at least one buckle lock and operable such that when said at least one buckle lock moves to said rest position, said first actuator means moves said friction surface to said free position; and
   second actuator means operable to move said at least one buckle lock from said locked position to said release position.

2. The child restraint seat of claim 1 wherein said at least one opening is at least one slot.

3. The child restraint seat of claim 1 further comprising an additional buckle lock; and
   said at least one opening includes two slots through said seat.

4. The child restraint seat of claim 1 wherein said tightening web is located substantially behind said backrest and beneath said seat of said child support with said second end and a portion of said tightening web extending away from said front portion of said child support.

5. The child restraint seat of claim 4 wherein said web adjuster includes a frame and a cam member pivotally mounted to said frame about a pivot axis, and said friction surface is a portion of said cam member.

6. The child restraint seat of claim 5 wherein said friction surface is a plurality of teeth formed on said cam member.

7. The child restraint seat of claim 1 wherein said locked position of said at least one buckle lock is between said rest position and said release position.

8. The child restraint seat of claim 7 wherein when said at least one buckle lock is movably mounted in said housing and moved from said rest position to said locked position, said friction surface of said web adjuster moves from said free position to said web engageable position.

9. The child restraint seat of claim 8 wherein
   said at least one buckle lock is biased to return to said rest position by a compression spring mounted to said housing against said at least one buckle lock.

10. The child restraint seat of claim 9 wherein at least a portion of said second actuator means protrudes away from said front portion of said child support.

11. A harness, lock and adjuster assembly comprising:
    a seat with an opening;
    a housing mounted to said seat;
    a buckle lock mounted to said housing and having a rest position, a locked position and a release position;
    a harness having a first end and a second end, said harness including a buckle tongue on said first end with said buckle tongue extending through said opening when said buckle lock is in said locked position and a length of tightening web adjacent said second end;
    web adjuster means attached to said housing and having a friction surface biased to a web engageable position operable for holding said tightening web against movement in one direction along said length of said tightening web but movable to a free position allowing said web to move relative to said web adjuster means in either direction along said length of said tightening web;
    said buckle lock connected to said buckle tongue to secure said first end of said harness to said housing when in said locked position, said buckle lock being separated from said buckle tongue releasing said first end of said harness with respect to said housing when in said release position, said buckle lock being positionable in said rest position when said buckle tongue is separated from said buckle lock;
    first actuator means connecting said web adjuster means with said friction surface to said buckle lock and operable such that when said buckle tongue moves to said rest position, said first actuator means moves said friction surface to said free position; and second actuator means operable to move said buckle lock from said locked position to said release position.

12. A child restraint seat for mounting in a vehicle comprising:

a child support having a seat, a backrest and a front portion;

a harness having a first end and a second end, said harness mounted to said child support, said harness including a buckle tongue on said first end and a length of tightening web adjacent said second end;

a buckle lock attached to said child support and having a first position and a second position, said buckle lock connected to said buckle tongue to secure said first end of said harness to said child support when in said first position, said buckle lock separated from said buckle tongue releasing said first end of said harness with respect to said child support when in said second position;

web adjuster means attached to said child support and having a friction surface biased to a web engageable position operable for holding said tightening web against movement in one direction along said length of said tightening web while allowing movement of said tightening web in an opposite direction enabling tightening thereof while said buckle lock is in said first position, said web adjuster means movable to a free position spaced apart from said tightening web allowing said web to move relative to said web adjuster means in either direction along said length of said tightening web, said web adjuster means having a web adjuster;

operator means mounted to said child support operable upon depression to move said buckle lock apart from said tongue releasing same; and, connecting means connecting said web adjuster with said friction surface to said buckle lock and operable to move said friction surface to said free position when said buckle lock is in said second position and further operable to allow said friction surface to engage said tightening web when said buckle lock is in said first position; and, wherein;

said seat includes a tongue slot aligned with said buckle lock which is located beneath said child support, said web adjuster means including spring means operable to bias said web adjuster to said web engageable position but yieldable to allow said buckle lock when said tongue is removed from said tongue slot to pull said web adjuster to said free position; said seat includes an additional tongue slot aligned with an additional buckle lock located beneath said child support.

13. A child support comprising:

seat means including a seat with an opening;

a harness mounted to said seat means, said harness including a first end and a second end;

adjustment means mounted to said seat means with said first end extending through said adjustment means, said adjustment means including a locked position and an unlocked position with said adjustment means operable to limit movement of said first end when in said locked position and to allow movement of said first end when in said unlocked position;

first locking means mounted to said second end of said harness;

second locking means mounted to said seat means and located beneath said seat, said second locking means operable to bold said second end of said harness relative to said seat means when said first locking means is extended through said opening and connected to said second locking means, and, means movably mounted to said seat means and extending between said second locking means and said adjustment means beneath said seat being operable to simultaneous allow said adjustment means to move to said locked position and connect said second locking means to said first locking means and further operable to simultaneous move said adjustment means to said unlocked position while unlocking said second locking means relative to said first locking means.

14. A harness control latch machanism for a seat with an opening comprising:

a harness mountable to said seat, said harness including a first end and a second end;

an adjustor mountable to said seat with said first end extending through said adjustor, said adjustor including a locked position and an unlocked position;

a first lock mounted to said second end of said harness;

a second lock mountable to said seat and locatable beneath said seat, said first lock extendable through said opening to lock to said second lock, and, an operator movably mountable to said seat and extendable beneath said seat between said second lock and said adjustor to allow said adjustor to move said locked position and connect said second lock to said first lock and further operable to move said adjustor to said unlocked position while unlocking said second lock relative to said first lock.

* * * * *

UNITED STATES PATENT AND TRADEMARK OFFICE
CERTIFICATE OF CORRECTION

PATENT NO. : 5,286,090
DATED : February 15, 1994
INVENTOR(S) : Harry W. Templin and David J. Lee It is certified that error appears in the above-identified patent and that said Letters Patent is hereby corrected as shown below:

Column 5, line 13 delete "134" and insert --134'--.

Column 8, line 25 delete "110" and insert --100--.

Signed and Sealed this

Second Day of August, 1994

Attest:

BRUCE LEHMAN

Attesting Officer

Commissioner of Patents and Trademarks